US011137204B2

(12) United States Patent
Shah et al.

(10) Patent No.: US 11,137,204 B2
(45) Date of Patent: Oct. 5, 2021

(54) PROCESS AND APPARATUS FOR PRODUCING CARBON MONOXIDE

(71) Applicants: Minish M.. Shah, E. Amherst, NY (US); Bryan S. Kalp, Grand Island, NY (US); Gary W. Fenner, Grand Island, NY (US); Sameer Parvathikar, Durham, NC (US)

(72) Inventors: Minish M.. Shah, E. Amherst, NY (US); Bryan S. Kalp, Grand Island, NY (US); Gary W. Fenner, Grand Island, NY (US); Sameer Parvathikar, Durham, NC (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 359 days.

(21) Appl. No.: 15/247,233

(22) Filed: Aug. 25, 2016

(65) Prior Publication Data
US 2018/0058757 A1 Mar. 1, 2018

(51) Int. Cl.
F25J 3/02 (2006.01)
C01B 3/50 (2006.01)
F25J 3/08 (2006.01)

(52) U.S. Cl.
CPC ............ *F25J 3/0295* (2013.01); *C01B 3/506* (2013.01); *F25J 3/0223* (2013.01); *F25J 3/0233* (2013.01);
(Continued)

(58) Field of Classification Search
CPC .......... F25J 3/223; F25J 3/0261; F25J 3/0271; F25J 3/0625; F25J 3/0665; F25J 3/0675
See application file for complete search history.

(56) References Cited

U.S. PATENT DOCUMENTS 3,442,767 A * 5/1969 Hall ..................... B01D 3/322
202/153
5,509,271 A 4/1996 Billy et al.
(Continued)

FOREIGN PATENT DOCUMENTS

DE 2912761 A1 * 10/1980 ............... C07C 7/09
DE 4325513 A1 12/1994
(Continued)

OTHER PUBLICATIONS

Machine Translation of DE-2912761.*
(Continued)

*Primary Examiner* — John F Pettitt, III
(74) *Attorney, Agent, or Firm* — Iurie A. Schwartz

(57) ABSTRACT

The present invention relates to a cold box cycle which allows for independent control of the heat supplied for reboilers associated with the separation columns. More specifically, the invention relates to the tight control of the hydrogen removal separation, thus avoiding the possibility of excess reboiling in this separation. Optimal reboiling also results in a lower temperature of the hydrogen depleted liquid from this separation. As this stream is used to provide a portion of the cooling at the cold end of the primary heat exchanger, lower temperatures facilitate cooling of the incoming syngas feed, reducing carbon monoxide (CO) losses into the crude hydrogen stream from the high pressure separator. Lower CO in the crude hydrogen allows for smaller hydrogen purification equipment.

11 Claims, 5 Drawing Sheets

(52) U.S. Cl.
CPC .......... *F25J 3/0252* (2013.01); *F25J 3/0261* (2013.01); *F25J 3/08* (2013.01); *C01B 2203/047* (2013.01); *C01B 2203/048* (2013.01); *F25J 2200/38* (2013.01); *F25J 2200/40* (2013.01); *F25J 2200/74* (2013.01); *F25J 2200/76* (2013.01); *F25J 2205/04* (2013.01); *F25J 2205/40* (2013.01); *F25J 2205/60* (2013.01); *F25J 2205/64* (2013.01); *F25J 2205/80* (2013.01); *F25J 2210/04* (2013.01); *F25J 2210/06* (2013.01); *F25J 2210/18* (2013.01); *F25J 2210/42* (2013.01); *F25J 2220/02* (2013.01); *F25J 2240/02* (2013.01); *F25J 2245/02* (2013.01); *F25J 2270/04* (2013.01); *F25J 2270/24* (2013.01); *F25J 2270/42* (2013.01); *F25J 2270/904* (2013.01)

(56) References Cited

U.S. PATENT DOCUMENTS

| 5,832,747 | A | * | 11/1998 | Bassett | .................. C01B 3/506 |
| | | | | | 62/630 |
| 6,070,430 | A | | 6/2000 | McNeil et al. | |
| 6,161,397 | A | | 12/2000 | McNeil et al. | |
| 6,266,976 | B1 | | 7/2001 | Scharpf | |

FOREIGN PATENT DOCUMENTS

| WO | WO-2008087318 | A2 | * | 7/2008 | ............. F25J 3/0233 |
| WO | WO-2010015764 | A2 | * | 2/2010 | ............. C01B 3/382 |
| WO | WO-2013178901 | A2 | * | 12/2013 | ............. F25J 3/0223 |

OTHER PUBLICATIONS

Machine translation of WO 2013178901.*
Translation of DE 43 25 513.*
Walter H. Scholz; Tieftemperatur-Technologie im Rahmen der Kohleveredelung; Linde Berichte Aus Technik Und Wissenschaft, No. 51, Jan. 1, 1982 (Jan. 1, 1982), pp. 3-14, XP001254198, figures 4,5.
International Search Report, dated Nov. 14, 2017.

* cited by examiner

PROCESS AND APPARATUS FOR PRODUCING CARBON MONOXIDE

FIELD OF THE INVENTION

The present invention relates to a method of separating carbon monoxide from a synthesis gas containing hydrogen, carbon monoxide, methane, water, and carbon dioxide. More specifically, the invention is directed to a method of separating carbon monoxide from syngas mixtures with low methane content by cryogenic means where a partial condensation cycle is generally employed, and more specifically towards providing reboiler duties for a separator or distillation column used for removing hydrogen from carbon monoxide and a separate distillation column used for separating carbon monoxide and methane.

BACKGROUND OF THE INVENTION

Description of Related Art

Hydrocarbons such as natural gas, naphtha, liquefied petroleum gas (LPG) can be catalytically converted with steam to obtain a synthesis gas (i.e., a mixture of hydrogen ($H_2$) and carbon monoxide (CO), methane ($CH_4$), water ($H_2O$) carbon dioxide ($CO_2$) commonly referred to as "syngas"). This so-called steam methane reforming process is well known, and it is typically utilized to obtain syngas which is ultimately utilized in the production of hydrogen or chemicals such as methanol and ammonia. Conventional techniques for the separation of CO from the rest of the syngas constituents have been known. For instance, cryogenic purification methods, such as partial condensation or scrubbing with liquid methane are well known techniques. Other processes employed for the purification are adsorption processes such as pressure swing adsorption ones.

In a typical cryogenic and non-cryogenic gas mixture separation such as the one disclosed in U.S. Pat. No. 6,161,397 to McNeil et al., the cryogenic separation of a feed gas mixture provides at least one product gas containing a desired molar ratio of hydrogen and carbon monoxide from a gaseous syngas having a different molar ratio. However, the method and apparatus of this patent discloses an integrated heat exchanger with fixed area but no independent control of the amount of reboiling for neither the $CO/H_2$, or the $CO/CH_4$ separations. The disadvantage of this lack of control can result in increased recirculation and compression of recycle streams, as well as the need for larger compressors.

U.S. Pat. No. 6,266,976 to Scharpf discloses a cryogenic partial condensation cycle to produce purified CO and optionally $H_2$ or syngas, where the design requires varying the operating liquid level in the respective columns/separators to influence the circulation rate of the reboilers, thereby adjusting the amount of reboiling for these separations. The disadvantage of this method is that the column operating levels must be adjusted to control the amount of reboiling in order to minimize recycle flows and equipment sizing requirements. This can make the system more susceptible to high or low level excursions or possibly completely loosing liquid levels in the event of an upset since the columns are not operating at an optimal control level.

U.S. Pat. No. 6,070,430 to McNeil et al. discloses the separation of CO from nitrogen-contaminated gaseous mixtures containing hydrogen. The process includes separating nitrogen and carbon monoxide contents of a liquid fraction in a distillation column to provide nitrogen-freed carbon monoxide liquid bottoms and nitrogen-enriched vapor overheads; condensing at least a portion of the overheads; and returning at least a portion of said condensed overheads to the nitrogen-separation column as reflux, the improvement is that the vapor overheads portion is condensed by heat exchange against a recycle heat pump stream derived from said gaseous mixture and containing hydrogen and carbon monoxide.

To overcome the disadvantages of the related art, it is an object of the present invention to provide a process and system that allow direct and independent control of two reboilers associated with the hydrogen removal column and CO/CH4 separation column, thereby avoiding the possibility of excess reboiling in the separation. As this hydrogen depleted liquid stream is used to provide a portion of the cooling at the cold end of the primary heat exchanger, lower temperatures facilitate cooling of the incoming syngas feed, reducing CO losses into the crude hydrogen stream from the high pressure separator. Lower CO in the crude hydrogen allows for smaller hydrogen purification equipment and lower flow of tail gas from the hydrogen purification unit. As the hydrogen rich vapor stream from the hydrogen removal column and the tail gas stream from the hydrogen purification unit are compressed and recycled back to the feed, minimizing these streams decreases the required size of the installed recycle compressor and the corresponding power required to compress these streams, saving both capital and operating expense.

Another advantage of the present invention is that it allows for tight control of the $CO/CH_4$ reboiling, resulting in the minimum required reflux flow. Providing the minimum required reflux flow allows for a reduction in the power and size of the carbon monoxide recycle compressor, again saving capital and operation expense.

Other objects and aspects of the present invention will become apparent to one of ordinary skill in the art upon review of the specification, drawings and claims appended hereto.

SUMMARY OF THE INVENTION

According to an aspect of the invention, a method for the separation of carbon monoxide and hydrogen from a syngas feedstock is provided. The method includes:

cooling and partially condensing the syngas feedstock containing carbon monoxide and hydrogen in a primary heat exchanger to produce a cooled and partially condensed syngas feed stream;

separating the cooled and partially condensed syngas feed stream in a first hydrogen rich vapor stream and a first carbon monoxide rich liquid stream in a high pressure separator;

feeding the first carbon monoxide rich liquid stream to a hydrogen removal column operating at a pressure lower than the high pressure separator, wherein a second hydrogen rich vapor stream is separated from a second carbon monoxide rich stream;

splitting the second carbon monoxide rich stream into two portions wherein a first portion of the second carbon monoxide rich stream is at least partially vaporized in the primary heat exchanger and providing a second portion of the second carbon monoxide rich stream wherein both portions are introduced into a carbon monoxide/methane column for separating purified carbon monoxide vapor stream from a methane rich liquid stream;

separating a portion of the cooled syngas feedstock to provide reboiling duty to a carbon monoxide/methane column reboiler and partially condensing a first portion of the cooled syngas feedstock; and routing said partially condensed first portion of the partially condensed syngas feedstock to a phase separator and separating a third vapor feed stream fraction wherein at least a portion thereof is routed to a hydrogen removal column reboiler which is in communication with said hydrogen removal column providing reboiling duty to said hydrogen removal column reboiler.

According to another aspect of the invention, a method for the separation of carbon monoxide and hydrogen from a syngas feedstock is provided. The method includes:

cooling and partially condensing the syngas feedstock containing carbon monoxide and hydrogen in a primary heat exchanger to produce a cooled and partially condensed syngas feed stream;

separating the cooled and partially condensed syngas feed stream in a first hydrogen rich vapor stream and a first carbon monoxide rich liquid stream in a high pressure separator;

feeding the first carbon monoxide rich liquid stream to a hydrogen hydrogen removal column operating at a pressure lower than the high pressure separator, wherein a second hydrogen rich vapor stream is separated from a second carbon monoxide rich stream;

splitting the second carbon monoxide rich stream into two portions wherein a first portion of the second carbon monoxide rich stream is at least partially vaporized in the primary heat exchanger and providing a second portion of the second carbon monoxide rich stream wherein both portions are introduced into a carbon monoxide/methane column for separating purified carbon monoxide vapor stream from a methane rich liquid stream;

separating a portion of the cooled syngas feedstock to provide reboiling duty to a carbon monoxide/methane column reboiler and separating a second portion of the cooled syngas feedstock to provide reboiling duty to the hydrogen removal column reboiler wherein each reboiler partially condenses the two syngas feedstock streams, respectively;

routing the two partially condensed syngas feedstock streams to a separator, wherein the syngas feedstock is separated into a liquid feed stream fraction and a vapor feed stream fraction; and directing the liquid feed stream fraction and the vapor stream fraction to the primary heat exchanger where the fractions are combined with the syngas feedstock and the mixture is further cooled, partially condensed and routed to the high pressure separator.

BRIEF DESCRIPTION OF THE FIGURES

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

The present invention provides for the cryogenic separation of carbon monoxide from mixtures containing at least hydrogen, carbon monoxide, and methane, particularly in cases where the methane content in the feed is low (<2%), and which necessitates the use of a partial condensation cycle. There are many types of production processes which may be used to produce a syngas mixture (i.e., the feed syngas) meeting this specification, including partial oxidation and auto thermal reforming. The syngas created in these processes must be cooled and the bulk water and $CO_2$ must be removed prior to further pretreatment in a prepurifier.

The important aspects of the invention include partially cooling the incoming feed syngas stream, separating at least a portion of the partially cooled feed syngas from the primary feed stream, and controlling the feed stream split flow to provide controlled reboiling heat. In one embodiment of the invention, a portion of feed syngas stream is split from the primary feed syngas stream partway through the main heat exchanger. The separated cooled feed stream is first partially condensed in one reboiler to provide heat for the $CO/CH_4$ separation. The flow of the split feed stream fraction to reboiler is controlled to achieve desired reboiling for CO/CH4 separation. The resulting partially condensed two-phase feed stream is separated into a CO-rich liquid stream and a $H_2$-rich vapor stream. At least a portion of the $H_2$-rich vapor stream is again split to provide the required flow for controlled reboiling of the flash separator, which removes hydrogen from the first hydrogen-depleted fraction. The remainder of the $H_2$-rich stream and CO-rich liquid streams are directed back to the main heat exchanger for further cooling and partial condensation. In another embodiment of the invention, two separate partially cooled syngas feed streams are split from the primary syngas feed stream partway through the main heat exchanger. Each of these feed streams is sent separately to each reboiler, where one stream is partially condensed for the $CO/CH_4$ separation and the other is partially condensed for the $CO/H_2$ separation. This arrangement has a significant advantage over prior art designs. Regardless of fluctuations in the process operation, the subject invention allows for direct and independent control of the duties required for the two reboilers, reducing the flow of recycle streams, compression power, and capital costs for recycle compression equipment.

Figure 1:
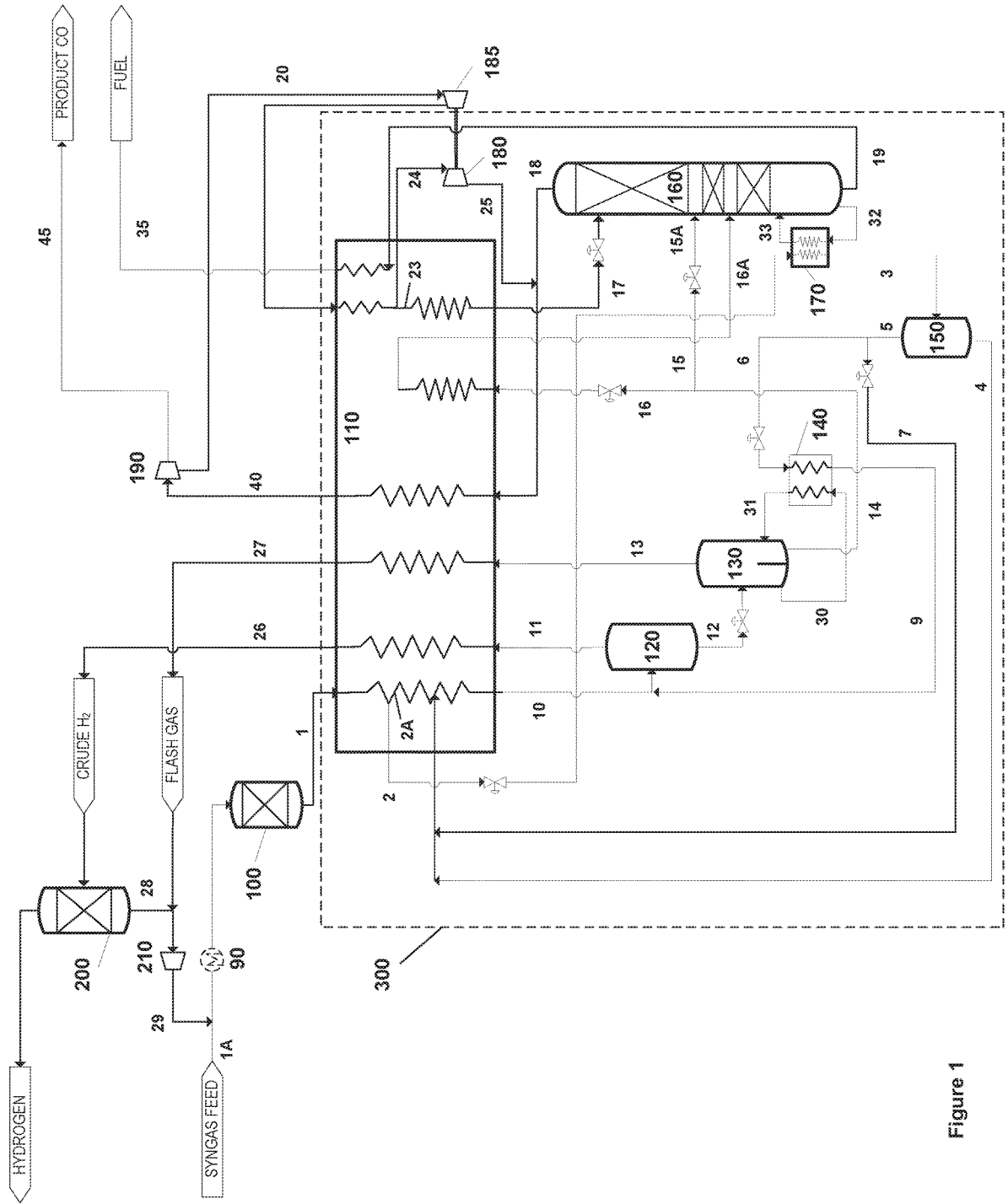
FIG. 1 is a process flow diagram of a partial condensation cold box cycle in accordance with one exemplary embodiment of the invention.

In one exemplary embodiment of the invention, a process is provided for cryogenically separating a mixture containing at least hydrogen, carbon monoxide, and methane. The syngas feed is generally available at pressure in the range of 200 to 500 psia. With reference to FIG. 1, the syngas feed 1A from a $CO_2$ removal unit is combined with a recycled offgas stream 29, optionally chilled in unit 90 to ~283° K and sent to a prepurifier 100, where moisture and $CO_2$ are removed from the syngas. Preferably the moisture and $CO_2$, by volume is less than or equal to 0.1 ppm. The dry feedstock is sent to the cold box 300 designed to operate a partial condensation process cycle for separation of syngas. As utilized herein, it will be understood that the cold box 300 at least contains primary heat exchanger 110, high pressure separator 120, hydrogen removal column 130, hydrogen removal column reboiler 140, carbon monoxide/methane column 160 and carbon monoxide/methane column reboiler 170. The dry syngas feedstock stream 1 from prepurifier 100 is cooled in an integrated multi-stream primary heat exchanger 110 which cools the two incoming feed streams against five to six warming streams of various compositions. Typically, the syngas entering the primary heat exchanger will have a composition generally in the following ranges for various components: $H_2$ 50-75 mol %, CO 25-50 mol %, $CH_4$ 0.1-4 mol % with small amounts (<0.5 mol %) of nitrogen and argon.

At least a portion of the cooled syngas feed as stream 2 is split off from the primary syngas feed stream 1, at a temperature ranging from 115 to 140° K. Stream 2 provides first reboiling duty for the $CO/CH_4$ column reboiler 170 and subsequently a split fraction generated from cooled stream 2 provides reboiling duty for the hydrogen removal column reboiler 140. The remainder of the primary syngas feed stream 2A is directed through the primary heat exchanger 110, where it continues to cool and partially condense. This feed stream fraction 2A, after getting further cooled and partially condensed in 110 to temperatures below 115° K, is combined with the further cooled feed stream fractions 4 and 7 obtained from stream 2 after stream 2 has provided reboiling duty to $CO/CH_4$ column reboiler 170. As defined herein, "reboiling duty" shall mean rate of heat transferred from a heat source stream (by way of example, stream 2 in the embodiment of FIG. 1) to the heat sink stream obtained from the distillation column or a phase separator (by way of example, stream 32 in the embodiment of FIG. 1) in order to at least partially vaporize the heat sink stream. The combined stream is further cooled and partially condensed in the primary heat exchanger 110 to temperature a temperature ranging from 85 to 100° K, and preferably in the 85 to 90° K range, exiting as stream 10.

The partially condensed syngas feed stream 10 at a temperature ranging from about 85 to 90° K is combined with the partially condensed stream 9 having a temperature of about 80 to 90° K from the hydrogen removal column reboiler 140 and directed to a high pressure separator 120 where it is separated into a first hydrogen-rich vapor stream 11 and a first CO-rich liquid stream 12. A majority of hydrogen (i.e., >95%) contained in the combined feed introduced into separator 120 is recovered in hydrogen-rich vapor, while >60% of CO, preferably >75% of CO is recovered in the CO-rich liquid. Most of the methane contained in the feed ends up in the first CO-rich liquid. Depending on the pressure and temperature in the separator 120, the first hydrogen rich stream 11 will contain 80-92% by volume hydrogen and 8-20% by volume CO and less than 0.1% each of methane, nitrogen and argon. The first CO-rich liquid stream 12 will contain 85-95% by volume of CO and 3-6% hydrogen depending on the conditions of feeds entering the phase separator 120. Higher pressure and lower temperature results in a hydrogen-rich stream with higher hydrogen concentration (with reduced CO loss) and a higher recovery of CO in the CO-rich liquid stream. Control of reboiling duties plays an important role in achieving lower temperature in high pressure separator 120, as explained herein. The first hydrogen-rich vapor stream 11 is warmed in the primary heat exchanger 110, with the stream exiting the primary heat exchanger 110 as crude hydrogen stream 26. This stream 26 is routed to a hydrogen purifier 200, which could be a pressure swing adsorption (PSA), but could be also a membrane. The first CO-rich liquid stream 12 exiting the lower end of the high pressure separator 120 is reduced in pressure to a pressure ranging from about 25 to 70 psia, preferably about 30 to 40 psia to create an initial two phase mixture at temperature ranging from 80 to 85° K range. This mixture is then separated in a hydrogen removal column to further separate remaining hydrogen in liquid CO to desired level for final purified CO product, as called for by the end user. As utilized herein, the term "hydrogen removal column" could be a phase separator, a stripping column, or similar devices. When product specifications for product CO stream 45 require hydrogen to be in 500-2500 ppm range, it is advantageous to use a phase separator with a divider wall as hydrogen removal column as shown in FIG. 1 for low pressure separator 130. The sump area of the low pressure separator 130 is divided to enable two stages of separation from a single phase separator and therefore achieve greater degree of hydrogen removal from CO. The two phase mixture is separated into a first hydrogen depleted crude liquid CO stream 30 and a hydrogen-enriched vapor (not shown) in a first zone of the phase separator. The hydrogen content in stream 30 will be less than 0.5% by volume. The first hydrogen depleted crude liquid CO stream 30 is withdrawn from the first zone and then partially reboiled in the hydrogen removal column reboiler 140. The reboiling is very slight such that less than three percent and preferably less than two percent of stream 30 is vaporized. Partially reboiled stream 31 is returned to the second zone of the sump area of low pressure separator 130 where it separates into a second hydrogen depleted crude liquid CO stream 14 and third hydrogen-rich vapor stream (not shown). The entire hydrogen-rich vapor from the phase separator is combined in the top undivided part of the phase separator 130 to form a second hydrogen-enriched vapor stream 13. The second hydrogen enriched vapor stream 13 is warmed in the primary heat exchanger 110 and exported as flash gas stream 27. The flash gas 27 is mixed with the tail gas 28 from hydrogen purifier 200, compressed in compressor 210, recycled and mixed with the syngas feed 1A from the $CO_2$ removal unit, and routed to prepurifier 100.

A portion 15 of the second hydrogen-depleted crude liquid CO stream 14 is split off and its pressure is reduced further to about 20-45 psia (and preferably 25-30 psia) before feeding it to the carbon monoxide/methane ($CO/CH_4$) column 160. The remaining portion 16 of the second hydrogen-depleted crude liquid CO stream 14 is at least partially vaporized and preferably completely vaporized in the primary heat exchanger 110 by heating it to 90-100° K and fed to $CO/CH_4$ column 160. Vaporization of stream 16 in multi-stream primary heat exchanger 110 provides part of the cooling duty for partial condensation of syngas feed 2A and condensation of recycle CO stream 40. To achieve the lowest possible temperature for stream 10, temperature of stream 16 must be kept as low as possible. For example, to achieve 89° K in stream 10, stream 16 temperature cannot be higher than 88° K, more preferably no higher than 87° K.

It is important to control reboiling duty in reboiler 140 so that temperature of partially reboiled stream 31 is just enough to achieve desired removal of hydrogen in hydrogen removal column 130. By maintaining stream 31 at lowest possible temperature, temperature of stream 14 and temperature of stream 16 are kept at lowest possible values. Thus, control of reboiling duty in 140 ultimately leads to lowest possible temperature in stream 10, which improves separation efficiency of high pressure separator 120. This is illustrated in detail in Example 1, below.

Two crude CO streams 15A and 16A are fed to $CO/CH_4$ column 160 at intermediate locations. Recycled purified CO stream 17 is also fed to $CO/CH_4$ column 160 at the top as a reflux after throttling it through a valve to pressure of $CO/CH_4$ column 160. Reboiler 170 associated with $CO/CH_4$ column 160 provides vapors to the bottom of $CO/CH_4$ column 160. Operating pressure of $CO/CH_4$ column 160 could range anywhere from about 20 to 45 psia and preferably in 24 to 30 psia range. Temperature at the top of $CO/CH_4$ column could be in from about 84 to 90° K and from about 95 to 120° K at the bottom. Actual temperature values will depend on the selected operating pressure and purities of products from the column. Countercurrent flow of liquid and vapor in the $CO/CH_4$ column results in separation of low pressure purified CO vapor stream 18 at the top of the column, and a methane rich liquid stream 19 at the bottom of the column. A portion of methane rich liquid 32 from the column is reboiled in reboiler 170 and returned to the $CO/CH_4$ column as stream 33. The methane rich liquid product is withdrawn as stream 19 and it is vaporized and warmed in the primary heat exchanger 110 and further exported out as fuel stream 35.

The low pressure purified CO vapor stream 18 from the $CO/CH_4$ column 160 is combined with expanded CO stream 25 generated in CO turbine 180 and the combined stream is warmed in the primary heat exchanger 110. The warmed low pressure CO stream 40 is compressed in compressor 190 where a portion of the CO is taken off at an intermediate pressure (in 100 to 300 psia range) as stream 20 and remainder of pressurized CO is optionally further compressed and recovered as product CO stream 45. Stream 20 is further compressed in a booster compressor 185 to about 130 to 350 psia and cooled to an intermediate temperature of about 130 to 170° K in the primary heat exchanger 110. A portion of the partially cooled CO stream is taken off as stream 24 and it is expanded to a pressure of 25-30 psia in a CO turbine 180 to provide refrigeration for the cryogenic separation process. The temperature of expanded stream will be 85-90° K. The expanded stream 25 is mixed with low pressure purified CO vapor stream 18 from CO/CH4 column 160. The remainder of the partially cooled CO stream 23 continues through primary heat exchanger 110 where it is cooled further and liquefied and used to provide reflux stream 17 to $CO/CH_4$ column 160.

In this particular embodiment, an important feature lies in providing reboiling heat for the $H_2/CO$ high pressure separator 120, and the $CO/CH_4$ column 160 by first splitting at least a portion of the cooled syngas feed as stream 2 from primary syngas feed stream 1 to provide reboiling duty for the $CO/CH_4$ column reboiler 170, thereby partially condensing first syngas feed stream fraction 3. Thereafter, the two phase first syngas feed stream fraction 3 is separated in a separator 150 into a second liquid feed stream fraction 4 and a third vapor feed stream fraction 5. The third vapor feed stream fraction 5 further split into a fourth vapor feed stream fraction 6 and a fifth vapor feed stream fraction 7. The fourth vapor feed stream fraction 6 provides heat for reboiling a first hydrogen depleted crude liquid CO stream 30 in the hydrogen removal column reboiler 140 and exits the reboiler as a sixth partially condensed feed stream fraction 9. The flow of fourth vapor feed stream fraction 6 is controlled such that the amount of reboiling duty (heat) provided in the hydrogen removal column reboiler 140 is just sufficient to achieve hydrogen concentration in stream 14 below a certain value such that hydrogen concentration in purified CO product stream 45 is below a specified limit dictated by the end user's needs. When stream 14 is separated in $CO/CH_4$ column 160, any remaining hydrogen in stream 14 carries over into stream 18 and eventually into stream 45. As a result, on one hand it is important to have sufficient reboiling duty in 140 to achieve the desired product CO specification for hydrogen, while on the other hand, it is also important to prevent excess reboiling in order to achieve lowest possible temperature in high pressure separator 120, as discussed earlier. The second liquid feed stream fraction 4 and the fifth vapor feed stream fraction 7 are combined with the partially condensed primary syngas feed stream 2A, and the mixture is subjected to further cooling and partial condensation in the primary heat exchanger 110, exiting as stream 10. The sixth partially condensed feed stream fraction 9 and the partially condensed syngas feed mixture 10 exiting primary heat exchanger 110 are combined and directed to the high pressure separator 120.

This apparatus and process of using a portion of the feed to provide reboiling duty to the $CO/CH_4$ column reboiler 170, and then using a portion of the second hydrogen-rich vapor from the resulting partially condensed stream provides flexibility to control duties to reboilers 140 and 170 independently of each other and independently of the level in either the low pressure separator 130 or $CO/CH_4$ column 160 via independent control of flow rates of cooled syngas stream 2 and fourth vapor feed stream 6. In addition, introducing the second liquid feed stream fraction 4 and the fifth vapor feed stream fraction 7 back into the primary heat exchanger 110 for further cooling prior to sending them to the high pressure separator 120, results in the lowest possible temperature in separator 120. This in turn minimizes the CO concentration in crude hydrogen 26 and increases the single pass CO recovery of the cold box, reducing recycle flow and power.

Figure 2:
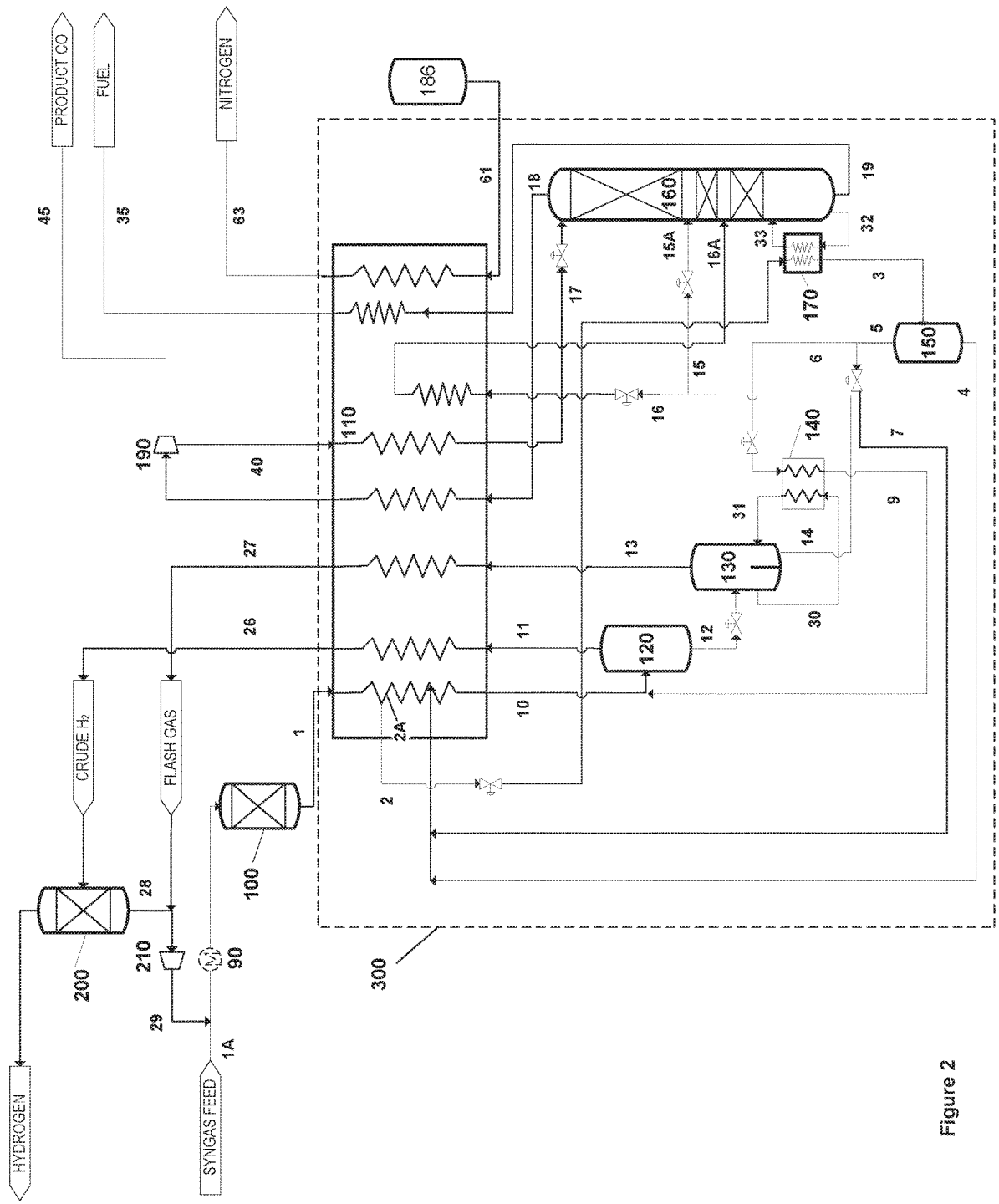
FIG. 2 illustrates the partial condensation cold box cycle of FIG. 1 with a liquid nitrogen refrigeration system.

As illustrated in FIG. 2, the embodiment of FIG. 1 is modified such that refrigeration is not provided by a CO expansion turbine. For a smaller capacity plant, the capital cost of expansion turbine is high and in such instance it is advantageous to reduce such expenditures by using liquid nitrogen when it is available at reasonable cost. As shown in FIG. 2, a liquid nitrogen tank 186 from which a stream of nitrogen 61 is send to the primary heat exchange 110 to provide refrigeration. Liquid nitrogen is available at about 80-85° K and its vaporization and subsequent warming in primary heat exchanger 110 provides part of the duty for cooling streams 1 and 26.

Figure 3:
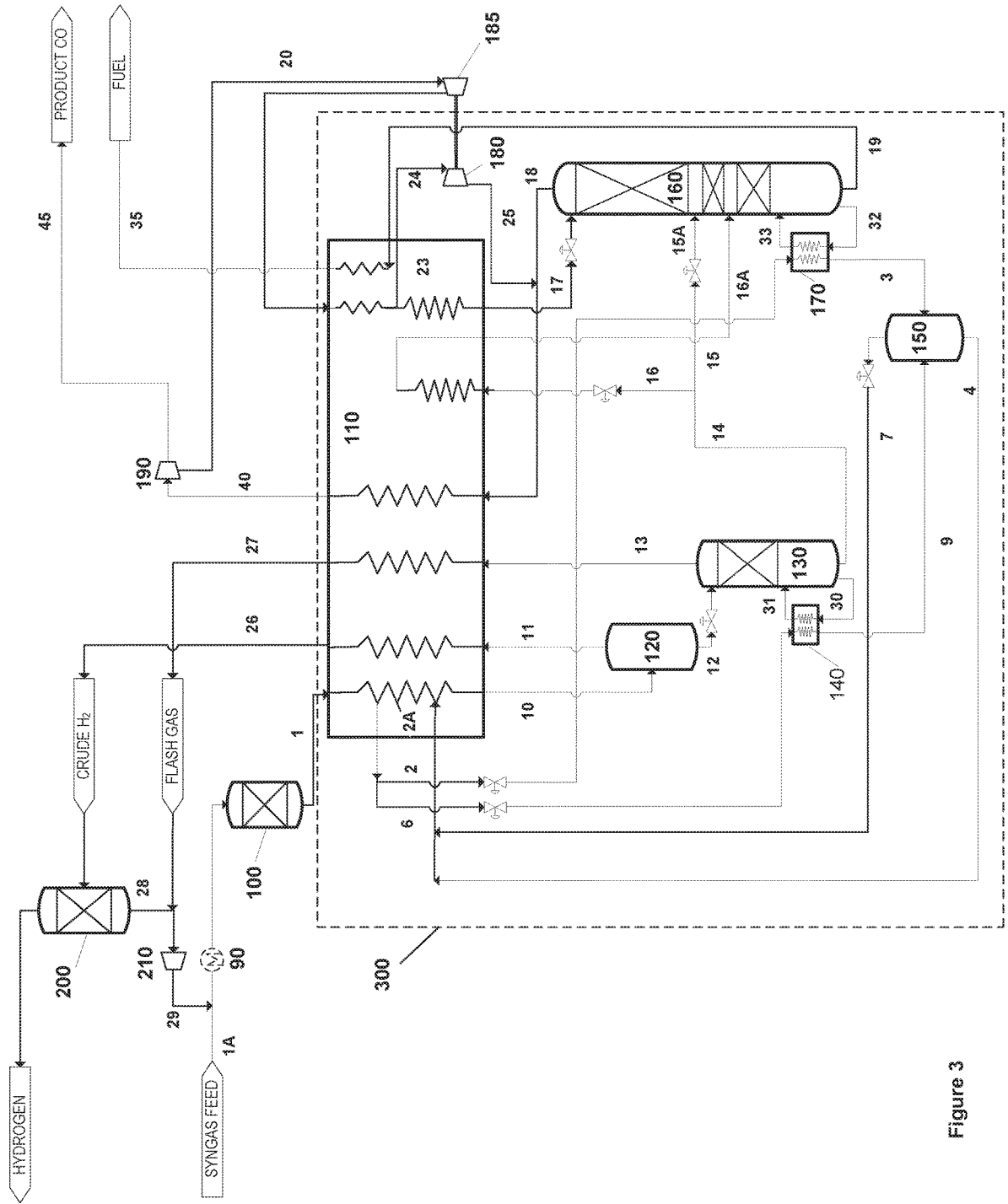
FIG. 3 is a process flow diagram of illustrating another embodiment of the cold box cycle of the present invention.

Another exemplary embodiment of the invention shown in FIG. 3 is advantageous when the desired hydrogen concentration in purified CO is below 500 ppm. In this embodiment, stripping column 130 is deployed as a hydrogen removal column. In this embodiment, the syngas feed 1A from a $CO_2$ removal unit is combined with a recycled offgas stream 29, optionally chilled in unit 90 to ~283° K and sent to a prepurifier 100, where moisture and $CO_2$ are removed from the syngas. Preferably the moisture and $CO_2$, by volume is less than or equal to 0.1 ppm. The dry syngas stream 1 from prepurifier 100 is cooled in an integrated multi-stream primary heat exchanger 110 which cools the two incoming feed streams against five to six warming streams of various compositions. Typically, the syngas entering the primary heat exchanger 110 will have a composition generally in the following ranges for various components: $H_2$ 50-75 mol %, CO 25-50 mol %, $CH_4$ 0.1-4 mol % with small amounts (<0.5 mol %) of nitrogen and argon.

At least a portion of the cooled syngas feed as stream 2 at a temperature ranging from about 115 to 140° K is split off from the primary syngas feed stream 1 to provide reboiling duty for the $CO/CH_4$ column reboiler 170, while a separate portion of the cooled syngas feed 6 at temperatures of about 110 to 130° K is split off from the primary syngas feed stream 1 to provide reboiling duty for the hydrogen removal column reboiler 140. The remainder of the primary syngas feed stream 2A is directed through the primary heat exchanger 110, where it continues to cool and partially condense. The feed stream fraction 2A, after being further cooled and partially condensed in primary heat exchanger 110, it is combined with the further cooled feed stream fractions 4 and 7 obtained from streams 2 and 6 after they have provided reboiling duties to 170 and 140. The combined stream is further cooled and partially condensed in the primary heat exchanger 110 to temperature ranging from about 85 to 100° K range, preferably 85 to 90° K, exiting as stream 10.

Partially condensed syngas feed stream 10 is directed to a high pressure separator 120 where it is separated into a first hydrogen-rich vapor stream 11 and a first CO-rich liquid stream 12. As described earlier, the first hydrogen rich stream 11 will contain 80-92% by volume hydrogen and 8-20% by volume CO and less than 0.1% each of methane, nitrogen and argon and the first CO-rich liquid stream 12 will contain 85-95% by volume of CO and 3-6% hydrogen depending on the condition of stream 10 entering the phase separator 120. The first hydrogen-rich vapor stream 11 is warmed in the primary heat exchanger 110 with the stream exiting the primary heat exchanger 110 as crude hydrogen stream 26. This stream 26 is routed to a hydrogen purifier 200 which is, for example, a pressure swing adsorption (PSA), but could also be a membrane. The first CO-rich liquid stream 12 is reduced to a pressure in the range from about 25 to 70 psia, preferably from about 30 to 40 psia to create an initial two phase mixture at temperature ranging from 80 to 85° K range. This mixture is then directed to the top of hydrogen stripping column 130 where it is separated into a hydrogen-depleted crude liquid CO stream 14 and a hydrogen-enriched vapor stream 13. The stripping column 130 contains two or more stages for mass transfer and it is associated with hydrogen removal column reboiler 140. The hydrogen depleted crude liquid CO stream 30 is withdrawn from the bottom of the hydrogen removal column 130 and then partially reboiled in the hydrogen removal column reboiler 140. Partially reboiled stream 31 is returned to the bottom of column 130 to generate vapors needed for removing hydrogen from CO. The CO-rich liquid containing hydrogen flows down in the column while vapor generated at the bottom flows up. The rising vapor strips off hydrogen from the CO-rich liquid such that hydrogen concentration in a hydrogen-depleted crude liquid CO contains is below desired levels. This latter vapor stream 13 is warmed in the primary heat exchanger 110 and exported as a flash gas 27. The flash gas 27 is mixed with waste gas 28 from the hydrogen purifier 200, compressed in compressor 210, recycled and mixed with the syngas feed 1A from the $CO_2$ removal unit, and routed to prepurifier 100.

A stream portion 15 of the hydrogen-depleted crude liquid CO stream 14 is split off and its pressure is reduced further to about 20-45 psia (and preferably 25-30 psia) before feeding it to the $CO/CH_4$ column 160 as stream 15A. The remaining stream portion 16 of the hydrogen-depleted crude liquid CO stream 14 is at least partially vaporized and preferably completely vaporized in the primary heat exchanger 110 by heating it to 90-100° K and fed to $CO/CH_4$ column 160 as stream 16A. Vaporization of stream portion 16 in primary heat exchanger 110 provides part of the cooling duty for partial condensation of syngas feed 2A and condensation of recycle CO stream 40. To achieve the lowest possible temperature for stream 10, the temperature of stream 16 must be kept as low as possible. As explained earlier in the exemplary embodiment of FIG. 1, precise control of reboiler duty enables lowest possible temperature for stream 14, which in turn leads to lowest possible temperature for stream 16.

Two crude CO streams 15A and 16A are fed to $CO/CH_4$ column 160 at intermediate locations. Recycled purified CO stream 17 is also fed at the top of $CO/CH_4$ column 160 as reflux after throttling it through a valve to pressure of $CO/CH_4$ column 160. Operating conditions of column 160 are similar to those described earlier for embodiment of FIG. 1. Reboiler 170 associated with $CO/CH_4$ column 160 provides vapors to the bottom of column 160. Countercurrent flow of liquid and vapor in the column results in separation of low pressure purified CO vapor stream 18 at the top of the column from a methane rich liquid stream 19 at the bottom of the $CO/CH_4$ column. A portion of methane rich liquid 32 from the column is reboiled in reboiler 170 and returned to column as stream 33. The methane rich liquid product is withdrawn as stream 19 and it is vaporized and warmed in the primary heat exchanger 110 and exported out as fuel stream 35.

The low pressure purified CO vapor stream 18 from $CO/CH_4$ column 160 is combined with expanded CO stream 25 from CO turbine 180 and the combined stream is warmed in primary heat exchanger 110. The warmed low pressure CO stream 40 is compressed in a compressor 190, where a portion of the CO is taken off at an intermediate pressure (in 100 to 300 psia range) as stream 20. This stream 20 is compressed in booster compressor 185 to about 130 to 350 psia and cooled to an intermediate temperature of about 130 to 170° K in the primary heat exchanger 110. A portion of the partially cooled stream 24 is expanded to a pressure of 25-30 psia in a CO turbine 180 to provide refrigeration. The temperature of expanded stream would be in the range of about 85-90° K. The remainder of the CO stream 23 continues through the primary heat exchanger 110 where it is liquefied and used to provide reflux 17 to $CO/CH_4$ column 160.

In this embodiment it is particularly important to provide reboiling heat for the $H_2/CO$ and the $CO/CH_4$ separation by first splitting at least a portion of the cooled syngas feed 2 from the primary syngas feed stream, to provide reboiling duty for the $CO/CH_4$ column reboiler 170, thereby partially condensing the first syngas feed stream fraction 3. Additionally, a separate portion of the cooled syngas feed 6 is split off to provide reboiling duty for the hydrogen stripping column reboiler 140, thereby partially condensing the second syngas feed stream fraction 9. Next the two phase syngas feed streams fractions 3 and 9, respectively, are separated in a separator 150 into a third liquid feed stream fraction stream 4 and a fourth vapor feed stream fraction stream 7. The fourth vapor feed stream fraction stream 7 and the third liquid feed stream fraction stream 4 are combined with the partially condensed primary syngas feed stream 2A and the mixture is subjected to further cooling and partial condensation in the primary heat exchanger 110, exiting as stream 10.

This process of using a portion of the feed to provide reboiling duty to reboilers 140 and 170 provides flexibility to control duties to these reboilers independently of each other and independently of the level in either the hydrogen stripping column 130 or $CO/CH_4$ column 160. Also, introducing the third liquid feed stream fraction stream 4 and the fourth vapor feed stream fraction 7 back into the primary heat exchanger 110 for further cooling prior to sending them to the high pressure separator 120, results in the lowest possible temperature in separator 120, which in turn minimizes the CO concentration in crude hydrogen and increases the single pass CO recovery of the cold box, reducing recycle flow and power.

Figure 4:
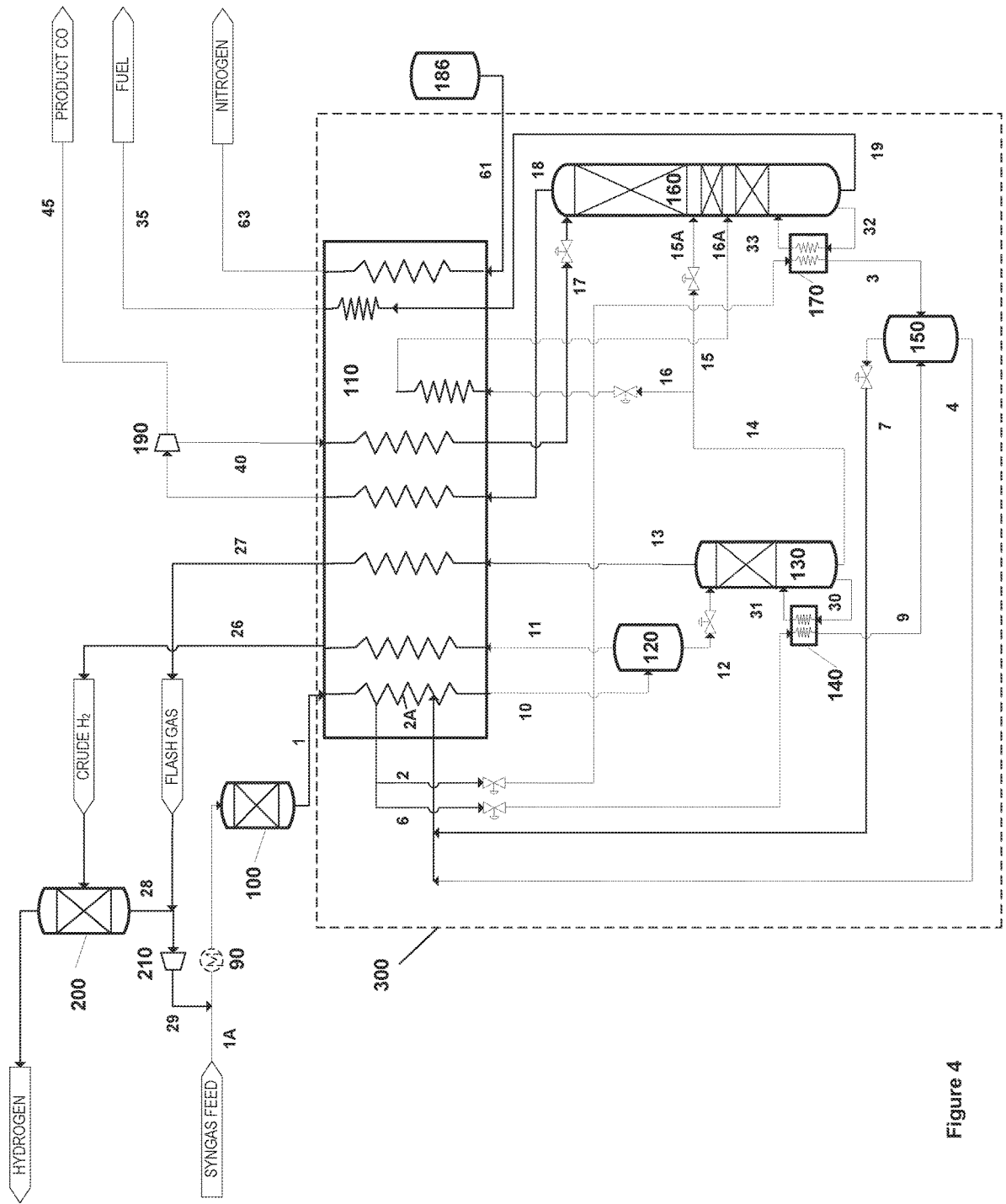
FIG. 4 illustrates the partial condensation cold box cycle of FIG. 3 with a liquid nitrogen refrigeration system.

With reference to the embodiment of FIG. 4, the embodiment of FIG. 3 is modified such that refrigeration is not provided by a CO expansion turbine. Instead, and as shown in FIG. 4, a liquid nitrogen source is utilized As shown in FIG. 2, an independent liquid nitrogen tank 186 from which a stream of nitrogen is send to the primary heat exchanger 110 to provide refrigeration.

Figure 5:
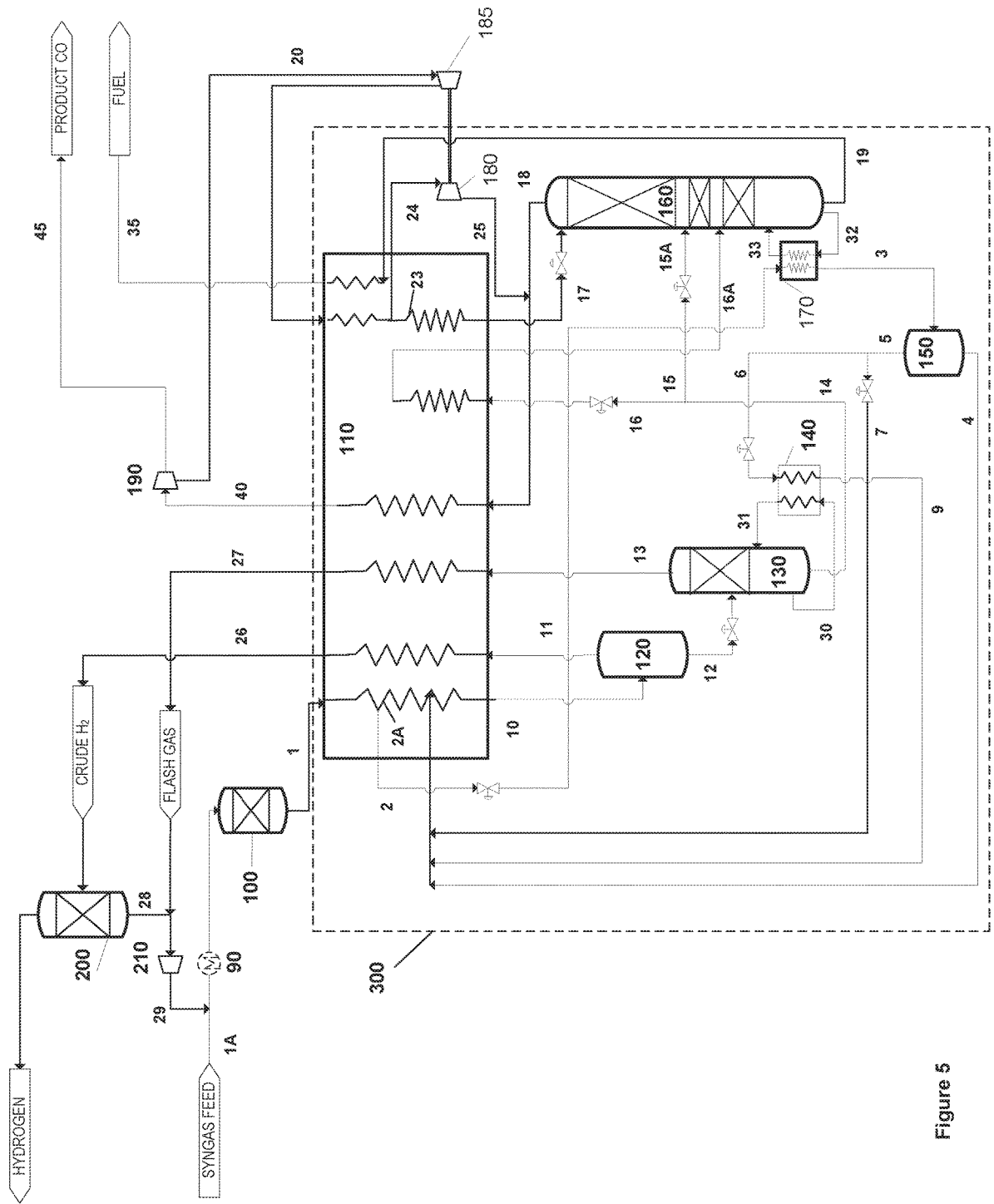
FIG. 5 is a process flow diagram of illustrating another embodiment of the cold box cycle of the present invention.

Another exemplary embodiment of the invention is shown in FIG. 5, which combines features of embodiments shown in FIG. 1 and FIG. 3. In the embodiment of FIG. 5, stripping column 130 is used as hydrogen removal column in order to achieve less than 500 ppm hydrogen in purified product CO stream 45. The configuration for providing reboiling heat in hydrogen removal column reboiler 140, and the $CO/CH_4$ column reboiler 170 is similar as shown in FIG. 1 by first splitting at least a portion of the cooled syngas feed as stream 2 from primary syngas feed stream 1 to provide reboiling duty for the $CO/CH_4$ column reboiler 170, thereby partially condensing first syngas feed stream fraction 3. Thereafter, the two phase first syngas feed stream fraction 3 is separated in a separator 150 into a second liquid feed stream fraction 4 and a third vapor feed stream fraction 5. The third vapor feed stream fraction 5 further split into a fourth vapor feed stream fraction 6 and a fifth vapor feed stream fraction 7. The fourth vapor feed stream fraction 6 provides heat for reboiling a first hydrogen depleted crude liquid CO stream 30 in the hydrogen removal column reboiler 140 and exits the reboiler as a sixth partially condensed feed stream fraction 9. Instead of sending stream 9 directly to high pressure separator 120, it is routed to primary heat exchanger 110 along with streams 4 and 7, where they are combined with stream 2A and combined stream is further cooled and exits primary heat exchanger 110 as stream 10. The remaining process description is similar to that described for the exemplary embodiment of FIG. 3.

In the above exemplary embodiment of FIGS. 1-5 reboilers 140 and 170 are shown as separate heat exchangers, though the invention could also be applied to a system where the reboilers are integrated in a single physical unit wherein feed and exit locations of hot and cold feed streams are appropriately positioned along the length of heat exchanger by matching temperatures of various streams with the expected temperatures in the heat exchanger at those positions to achieve the same desired result.

Example 1

Process simulations were carried out in accordance with the embodiment shown in FIG. 2 to demonstrate precise control of the reboiling duty in hydrogen separation reboiler 140, thus avoiding the possibility of excess reboiling in this separation. Optimal reboiling results in a reduction of the hydrogen rich vapor stream 13 from this separation and reduces loss of CO in hydrogen rich vapor from hydrogen removal column 130. Optimal reboiling also results in a lower temperature of the hydrogen depleted liquid 14 from this separation. As stream 14 is used to provide a portion of the cooling at the cold end of the primary heat exchanger 110, lower temperatures leads to lower temperature in stream 10, thereby reducing CO losses into the crude hydrogen stream 11 exiting from high pressure separator 120. Any decrease in amounts of CO in crude hydrogen 26 and flash gas 27 increases percent per pass CO recovery. Lower CO in the crude hydrogen 26 allows for smaller hydrogen purification equipment 200. As the flash gas 27 and the waste gas stream 28 from the hydrogen purification unit 200 are compressed and recycled back to the feed, minimizing these streams decreases the required size of the installed recycle compressor 210 and the corresponding power required to compress these streams, saving both capital and operating expense. A detailed analysis of the impact of poor control of reboiling duty in the hydrogen removal column reboiler is presented below for a scenario where product CO purity required 1000 ppm hydrogen. The analysis shows that an increase in the temperature of the reboiled stream 31 by only 1° K (from 87.6K to 88.6° K) can lead to a decrease in the single pass CO recovery of approximately 1.4%. This results in an approximate 3% increase in the flow of recycled gas 29. Allowing for the possibility of excess reboiling in this area would require a 4% increase in the design flow for the recycle compressor 210, increasing capital cost. Additionally, the quantity of CO in the feed to the downstream hydrogen purification unit increases by approximately 5%, resulting in higher capital cost for the hydrogen purification unit 200 to accommodate this possibility. If this level of excess reboiling was realized in the plant operation, the resulting overall plant power increases by 1.7%.

Example 2

Process simulations were carried out to in accordance with the embodiment shown in FIG. 2 to demonstrate precise control of the reboiling duty in $CO/CH_4$ column reboiler 170. The analysis shows that by decreasing reboiling duty by 5% lowers the temperature of partially vaporized stream 33 by 4.5° K. The purity of methane rich-stream 19 decreases from 92% $CH_4$ (by vol.) to 86.5% $CH_4$ (by vol.). The concentration of CO in stream 19 increases from 7.8% (by vol.) to 13.3% (by vol.). Since CO present in stream 19 represents loss of CO to fuel stream 35, the overall recovery of CO in product CO stream 45 decreases by 0.5%.

While the invention has been described in detail with reference to specific embodiments thereof, it will become apparent to one skilled in the art that various changes and modifications can be made, and equivalents employed, without departing from the scope of the appended claims.

What is claimed is:

1. A method for the separation of carbon monoxide product and hydrogen from a syngas feedstock, comprising:
    cooling and partially condensing the syngas feedstock (1) containing carbon monoxide and hydrogen in a primary heat exchanger (110) to produce a cooled and partially condensed syngas feed stream (10);
    separating the cooled and partially condensed syngas feed stream (10) into a first hydrogen rich vapor stream (11) and a first carbon monoxide rich liquid stream (12) in a separator (120);
    feeding the first carbon monoxide rich liquid stream (12) to a hydrogen removal column (130) operating at a pressure lower than the separator (120), wherein a second hydrogen rich vapor stream (13) is separated from a second carbon monoxide rich stream (14) in said hydrogen removal column (130);
    splitting said second carbon monoxide rich stream (14) into two portions wherein a first portion of the second carbon monoxide rich stream (16) is at least partially vaporized in the primary heat exchanger (110) and providing a second portion of the second carbon monoxide rich stream (15) wherein both portions are introduced into a carbon monoxide/methane column (160) for separating purified carbon monoxide vapor stream (18) from a methane rich liquid stream (19);

splitting a syngas feedstock portion (2) from the syngas feedstock (1) after partially cooling in the primary heat exchanger (110) and routing the cooled syngas feedstock portion (2) to provide reboiling duty to a carbon monoxide/methane column reboiler (170) and recovering a partially condensed syngas feedstock portion (3) from the carbon monoxide/methane column reboiler (170); and separating said partially condensed syngas feedstock portion (3) in a phase separator (150) to recover a third syngas vapor stream fraction (5), splitting the third syngas vapor stream fraction (5) into a fourth syngas vapor stream fraction (6) and fifth syngas vapor stream fraction (7) and partially condensing the fourth syngas vapor stream fraction (6) in a hydrogen removal column reboiler (140) which is in communication with said hydrogen removal column (130) providing reboiling duty to said hydrogen removal column reboiler (140) and recovering a partially condensed syngas stream fraction (9).

2. The method of claim 1, further comprising:

removing a second liquid fraction (4) from the phase separator (150), and mixing said second liquid fraction (4) and said fifth stream fraction (7) with the syngas feedstock stream (1) in the primary heat exchanger (110).

3. The method of claim 1, further comprising: routing said partially condensed syngas stream fraction (9) to the separator (120).

4. The method of claim 1, further comprising routing a stream of liquid nitrogen to the primary heat exchanger (110) and provide cooling duty.

5. The method of claim 1, further comprising warming the purified carbon monoxide vapor stream (18) in the primary heat exchanger (110), compressing said purified carbon monoxide vapor stream (18) and recycling a part of a compressed carbon monoxide stream to the carbon monoxide/methane column for reflux, and recovering a remainder carbon monoxide product.

6. The method of claim 5, further comprising: expanding a portion (24) of the compressed purified carbon monoxide vapor stream (20) in a CO turbine (180) to provide cooling duty in the primary heat exchanger.

7. The method of claim 2, further comprising: combining said second liquid fraction (4) and fifth stream fraction (7) and said partially condensed syngas stream fraction (9) with the syngas feedstock stream (2a) in the primary heat exchanger (110) where the mixture is further cooled, partially condensed and routed to the separator (120).

8. The method of claim 1, wherein the hydrogen removal column (130) has a sump area that is divided into two separate zones, enabling two zones of separation from said hydrogen removal column (130).

9. The method of claim 8, wherein a hydrogen depleted crude liquid CO stream (30) is withdrawn from a first zone of the sump area and then partially reboiled in the hydrogen removal column reboiler (140) and returning a partially reboiled stream (31) in a second zone of the hydrogen removal column (130).

10. The method of claim 1, wherein the hydrogen removal column (130) is a stripping column containing two or more stages for mass transfer and is in communication with the hydrogen removal column reboiler (140).

11. The method of claim 10, wherein a hydrogen depleted crude liquid CO stream (30) is withdrawn from a bottom of the stripping column (130), thereafter partially reboiled in the hydrogen removal column reboiler (140), and returned to said stripping column (130).

* * * * *